United States Patent [19]
Harris

[11] Patent Number: 5,496,616
[45] Date of Patent: Mar. 5, 1996

[54] OPTICAL ELEMENT FOR CORRECTING NON-UNIFORM DIFFRACTION EFFICIENCY IN A BINARY DIFFRACTIVE OPTICAL ELEMENT

[75] Inventor: Ellis D. Harris, Claremont, Calif.

[73] Assignee: Xerox Corporation, Stamford, Conn.

[21] Appl. No.: 364,904

[22] Filed: Dec. 27, 1994

[51] Int. Cl.⁶ .................................. B32B 3/00; G02B 5/18
[52] U.S. Cl. ...................... 428/172; 428/913; 359/569; 359/573; 359/576
[58] Field of Search .................................... 359/454, 457, 359/563, 565, 566, 569, 573, 576, 570, 642, 900, 742; 428/172, 167, 141, 212, 415, 913; 264/1.6, 1.9, 157

[56] References Cited

U.S. PATENT DOCUMENTS

| | | | |
|---|---|---|---|
| 4,895,790 | 1/1990 | Swanson et al. | 430/321 |
| 5,208,701 | 5/1993 | Maeda | 359/574 |
| 5,214,535 | 5/1993 | Harris | 359/565 |

OTHER PUBLICATIONS

W. Veldkamp & T. McHugh, "Binary Optics", *Scientific American*, vol. 266, No. 5, May 1992, pp. 92–97.
G. J. Swanson, "Binary Optics Technology: The Theory and Design of Multi–Level Diffractive Optical Elements", Lincoln Laboratory, Massachusetts Institute of Technology, *Technical Report 854*, 14 Aug. 1989.

*Primary Examiner*—Donald J. Loney
*Attorney, Agent, or Firm*—William Propp

[57] ABSTRACT

A first binary diffractive optical element has a multi-level surface relief phase grating structure on a substrate. The first binary diffractive optical element can be divided into regions commensurate with resolution requirements of the intended optical application and the diffraction efficiency of each region of the binary diffractive optical element measured. The lowest measured diffraction efficiency for a region of the first binary diffractive optical element will be taken as the reference efficiency. The diffraction efficiencies for all the regions of the binary diffractive optical element will be reduced region by region to the common value of the lowest measured diffraction efficiency by introducing compensating diffractive losses to the regions by a second, corrector binary diffractive optical element which has a binary surface relief phase grating structure on a substrate. By closely spacing the two binary diffractive optical elements in the optical path of an incident light beam, the resulting diffracted beam will have a uniform diffraction efficiency.

7 Claims, 3 Drawing Sheets

OPTICAL ELEMENT FOR CORRECTING NON-UNIFORM DIFFRACTION EFFICIENCY IN A BINARY DIFFRACTIVE OPTICAL ELEMENT

CROSS-REFERENCE TO RELATED APPLICATIONS

This application contains subject matter that is related to subject matter of U.S. patent application Ser. No. 08/364,903, now abandoned, filed contemporaneously, commonly assigned to the same-assignee herein and herein incorporated by reference.

BACKGROUND OF THE INVENTION

This invention relates to a binary diffractive optical element, and, more particularly, to an optical element for correcting non-uniform diffraction efficiency in a binary diffractive optical element.

The propagation of a light beam can be changed by three basic means: reflection by a mirror, refraction by a lens and diffraction by a grating. Optical systems traditionally rely on reflection and refraction to achieve desired optical transformations. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle into some given diffraction order is referred to as the diffraction efficiency for that order. The diffraction efficiency of a diffractive element is determined by the element's surface profile. If the light that is not redirected by the desired angle is substantial, the result will be an intolerable amount of scatter in the image or output plane of the optical system.

Theoretically, on-axis diffractive phase elements consisting of a grating having a given period can achieve 100 percent diffraction efficiency. To achieve this efficiency, however, a continuous phase profile within any given period is necessary. The theoretical diffraction efficiency of this surface profile is also relatively sensitive to a change in wavelength. By contrast, refractive and reflective elements are relatively wavelength insensitive. The technology for producing high quality, high efficiency, continuous phase profiles of the diffraction does not presently exist.

A compromise that results in a relatively high diffraction efficiency and ease of fabrication is a multi-level phase grating. The larger the number of discrete phase levels, the better the approximation of the continuous phase function. The multi-level phase surface profiles of the grating can be fabricated using standard semiconductor integrated circuit fabrication techniques.

As disclosed in Binary Optics Technology: The Theory and Design of Multi-level Diffractive Optical Elements by G. J. Swanson of the Lincoln Laboratory at the Massachusetts Institute of Technology, (Technical Report 854, 14 August 1989), herewithin incorporated by reference, and the resulting U.S. Pat. No. 4,895,790, a fabrication process starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material, such as Ge, ZnSe, Si, GaAs, and $SiO_2$, is coated with a thin layer of photoresist. A first lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary surface relief phase grating.

The process may be repeated using a lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process may be repeated a third and fourth time with lithographic masks having periods of one-quarter and one-eighth that of the first mask, and etching the substrates to depths of one-quarter and one-eighth that of the first etch. The successive etches result in elements having 8 and 16 phase levels. More masks than four might be used, however, fabrication errors tend to predominate as more masks are used.

This process produces a multilevel surface relief grating structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. The process can be carried out in parallel, producing many elements simultaneously, in a cost-effective manner.

An ideal sixteen phase level structure achieves 99 percent diffraction efficiency. The residual 1 percent of the light is diffracted into higher orders and manifests itself as scatter.

In practice, however, the actual efficiencies of actual binary diffractive optical elements is less than ideal due to fabrication errors, particularly in mask-to-mask registration and alignment errors. In many optical systems, these effects result in an untolerable amount of scatter.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

Diffractive optical elements approximated by etching binary levels in substrates using several masks commonly suffer an efficiency non-uniformity induced by fabrication errors.

In particular, when mask alignment errors are present, the approximation desired surface relief phase grating structure is degraded. Any lack of uniformity to an ideal multiple level surface relief phase grating structure will reduce the efficiency of the desired diffraction order and will scatter light energy into undesireable angles. For any given absolute alignment error of one of the masks, the relative alignment error relative to grating pitch or period is greatest at the extremes of a lens element where the grating period is smallest. For a diffractive optical element, a given misalignment of one of the masks will result in a loss of diffraction efficiency which may be small at the optical element center but will increase in proportion to distance from the center along some radius. Additional mask alignment errors will generate further inefficiencies but along other radii. Taken together, mask alignment errors will result in a random pattern of diffraction inefficiencies. Energy loss will, in general, be greatest near the optical element periphery.

Often a master binary diffractive optical element is fabricated on an IC fabrication line. This master will then be replicated for volume production. The diffraction inefficiency pattern will be fixed. In these cases, the pattern of inefficiency can be measured and a single compensation designed and utilized.

Even in perfectly aligned masks, the diffraction inefficiency from not achieving an actual continuous phase profile will vary with the radius of the optical element. In this case, the difference between the binary approximation of the continuous function would be a sawtooth pattern having a large pitch at the optical element center and decreasing pitch away from center. This sawtooth pattern difference acts as a variable grating which scatters light into many diffraction orders and away from the desired angle, scattering angles being greatest near the optical element periphery.

In the case of spherical diffractive optical elements, each grating is a circle about the optical element center and constitutes a Fresnel zone. In the binary approximation, the Fresnel zone becomes a series of circular steps.

The diffraction efficiency for a specific binary diffractive optical element will be dependent upon specific mask alignment errors during fabrication and cannot be determined prior to fabrication but can be measured following fabrication. In typical high volume replication, all diffraction inefficiency patterns will be identical in each copy and a common compensating corrector can be fabricated.

It is an object of this invention to provide a means to correct the non-uniform diffraction efficiencies of a binary diffractive optical element.

It is another object of this invention to provide a second two-level binary diffractive optical element which when in the optical path with a first binary diffractive optical element provides a uniform diffraction efficiency to a beam diffracted and attenuated by the two binary diffractive optical elements.

SUMMARY OF THE INVENTION

In accordance with the present invention, a first binary diffractive optical element has a multi-level surface relief phase grating structure on a substrate. The first binary diffractive optical element can be divided into regions commensurate with resolution requirements of the intended optical application and the diffraction efficiency of each region of the binary diffractive optical element measured. The lowest measured diffraction efficiency for a region of the first binary diffractive optical element will be taken as the reference efficiency. The diffraction efficiencies for all the regions of the binary diffractive optical element will then be reduced region by region to the common value of the lowest measured diffraction efficiency by introducing compensating diffractive losses to the regions by a second, corrector binary diffractive optical element which has a binary surface relief phase grating structure on a substrate. By closely spacing the two binary diffractive optical elements in the optical path of an incident light beam, the resulting diffracted beam will have a uniform diffraction efficiency.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
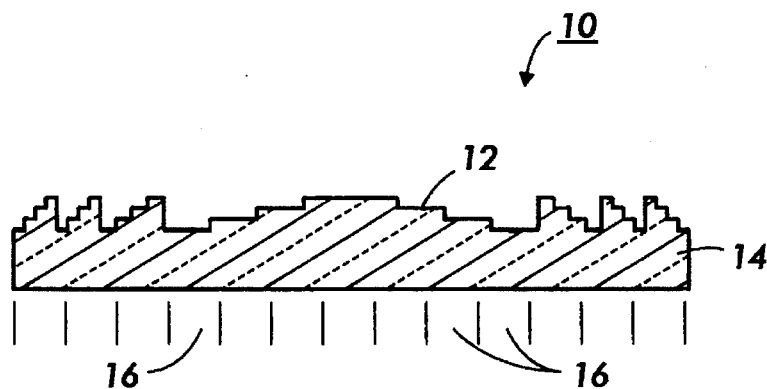
FIG. 1 is a schematic illustration of the cross-section side view of the binary diffractive optical element formed according to the present invention.

Reference is now made to FIG. 1, wherein there is illustrated a binary diffractive optical element 10 which has a multi-level surface relief phase grating structure 12 on a substrate 14, fabricated by the masking and etching method described previously.

Figure 2:
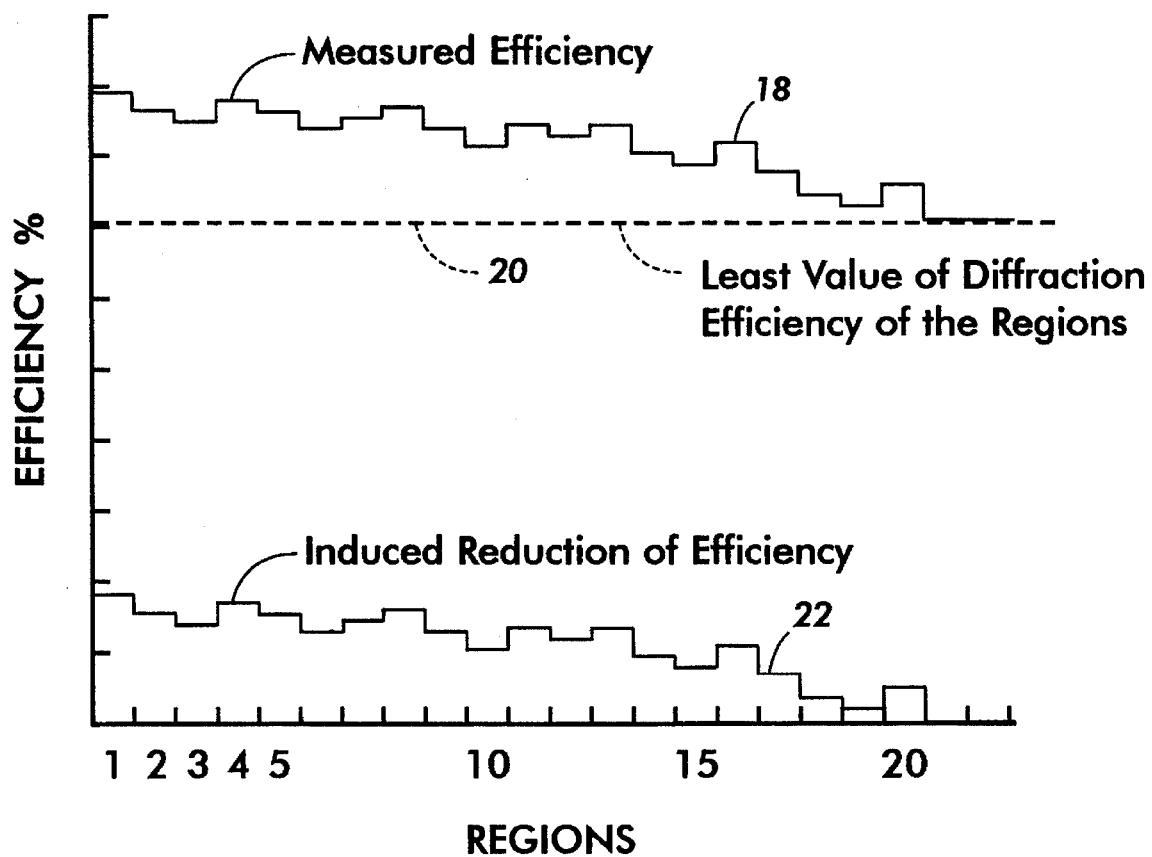
FIG. 2 is a graph showing typical diffraction efficiencies of regions of the binary diffractive optical element of FIG. 1 formed according to the present invention.

The binary diffractive optical element 10 of FIG. 1 can be divided into regions 16 commensurate with resolution requirements of the intended optical application and the diffraction efficiency 18 of each region of the binary diffractive optical element measured, as shown in FIG. 2.

Typically, diffraction efficiency could be measured utilizing a light source of appropriate wavelength, such as a semiconductor laser diode, along with a calibrated optical element, such as a silicon photo-diode. In the case of an optical element, since collimated light will be brought to a focus, this focus is an appropriate point to place the detector. A collimated beam from the light source would then be established having a cross-section commensurate with the regions being corrected. As this beam is scanned region by region over a copy of the binary diffractive optical element to be produced by replication, the relative transmission of each region is measured. This measurement data then becomes the raw data for development of a compensating corrector.

The diffractive efficiencies 18 will slightly fluctuate by a few percent from region to region of the binary diffractive optical element. Diffractive optical elements approximated by etching binary levels in substrates using several masks commonly suffer an efficiency non-uniformity induced by fabrication errors. These errors are most pronounced in the final detail areas where ray bending is maximum (typically at the peripery of the optical element) which are particularly sensitive to mask misalignment. Also, even a perfectly aligned mask fabricated binary diffractive optical element may still have non-uniform diffraction efficiency due to variations in the periods of the gratings in the structure.

Referring to FIG. 2, the lowest measured diffraction efficiency 20 for any of the regions of the binary diffractive optical element 10 will be taken as the reference efficiency. The diffraction efficiencies for all the regions 16 of the binary diffractive optical element will be reduced region by region to the common value of the lowest measured diffraction efficiency 20 by introducing compensating diffractive losses 22 to the regions.

Figure 3:
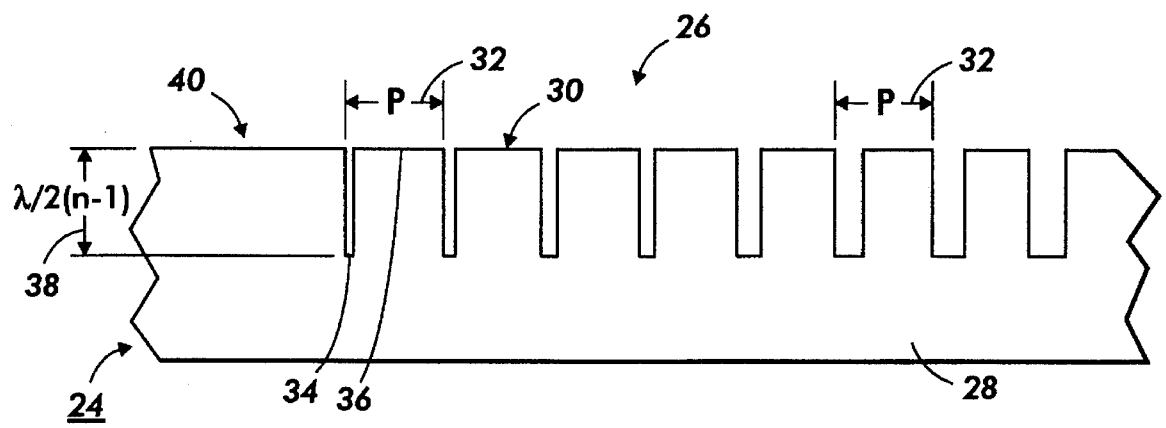
FIG. 3 is a schematic illustration of the cross-section side view of the corrector binary diffractive optical element formed according to the present invention.

A second, corrector binary diffractive optical element 24 of FIG. 3 has a binary surface relief phase grating structure 26 on a substrate 28, fabricated by the masking and etching method described previously. A single etch level for the corrector binary diffractive optical element 24 will suffice since only a few percent additional loss must be supplied.

The individual ruled gratings 30 of the binary surface relief phase grating structure 26 have a period P, 32. The binary surface relief phase grating structure is a single two-level surface. The individual gratings 30 of the binary surface relief phase grating structure 26 consist of a first surface of the reference surface 34 and a second surface of the phase level or etched line 36. The first and second surfaces represent different phase levels in the binary surface relief pattern in the phase grating structure. The sum of the widths of the first or reference surface 34 and the second or phase level or etched line surface 36 equal the period P, 37.

The ratio of the width W of the etched line to the period P could, in principle, vary from 0.0 to 1.0 which is equivalent to the etched line being 0 to 100 percent of the total period P of the individual grating. At a ratio of 0.5, however there would be 100% attenuation into the first diffraction order with zero transmittance of the non-diffracted beam. The ratio of width to period will be significantly less than 0.5 since only a few percentage of additional loss is anticipated. Typically, only a small percentage loss of less than 10% is expected for the second, corrector binary diffractive optical element to reduce the diffraction efficiency of the first binary diffractive optical element to the common value of the lowest measured diffraction efficiency.

The etched depth 38 of the etched line is $\lambda/2(n-1)$ where $\lambda$ is the wavelength of the light beam in air being transmitted through the binary diffractive optical element 10 and 24 and n is the index of refraction of the optical medium 28 having the surface relief structure 26.

Only a single mask and etch process is required to fabricate the binary diffractive optical element 24. All etched lines of the ruled grating 30 have the same etched depth 38. The optical function of selectively removing light from an incident beam is achieved by a variation of etch line width.

As shown in FIG. 3, a smooth optical surface 40 will transmit 100% of an incident beam with no scatter loss due to diffraction. If a grating such as a binary phase relief grating structure 26 is formed in that smooth surface, however, some of the light beam will be diffracted, thus attenuating the light remaining in the zero order.

When the etch depth is $\lambda/2(n-1)$ and when the etch line width 36 is half of the grating period 32, all of the light beam will be diffracted into the first or higher orders by the binary phase relief grating structure, leaving none in the zero order.

As the etch line width of the binary diffractive optical element increases from 0, the optical transmittance for the zero order, non-diffracted beam decreases as portions of the incident beam are diffracted into the first and higher orders by the binary surface relief phase grating structure. As the etch line width-to-period ratio varies from 0 to 0.5, the optical transmission will vary from 100% to 0% and will remain in phase.

For a given optical transmission percentage, T, ranging from unity to zero, then the relative etch line width, w, to the grating period is $$w = (1 - \sqrt{T})/2 \qquad \text{Equation 1}$$

The ratio of the etch line width to the total grating period can vary from period to period or, more specifically for this invention, region to region, across the binary surface relief phase grating structure 26 of the binary diffractive optical element 24, as shown in FIG. 3.

The optical attenuation properties of the binary surface relief phase grating structure 26 of the second, corrector binary diffractive optical element 24 are used to induce diffractive losses 22 in FIG. 2 across the surface of the second, corrector binary diffractive optical element 24. The required loss 22 of each region is measured and calculated and the appropriate optical transmittance determined. The losses 22 are the amount to be diffracted by the binary surface relief phase grating structure 26. From the optical transmittance, the appropriate etch line width to the total grating period for that region of the binary surface relief phase grating structure 26 of the second, corrector binary diffractive optical element 24 is calculated and the second, corrector binary diffractive optical element 24 is then fabricated. The loss 22 will be the light diffracted away into the first order with the resulting transmitted beam through the second binary diffractive optical element having a uniform diffraction efficiency from the first binary diffractive optical element.

Figure 4:
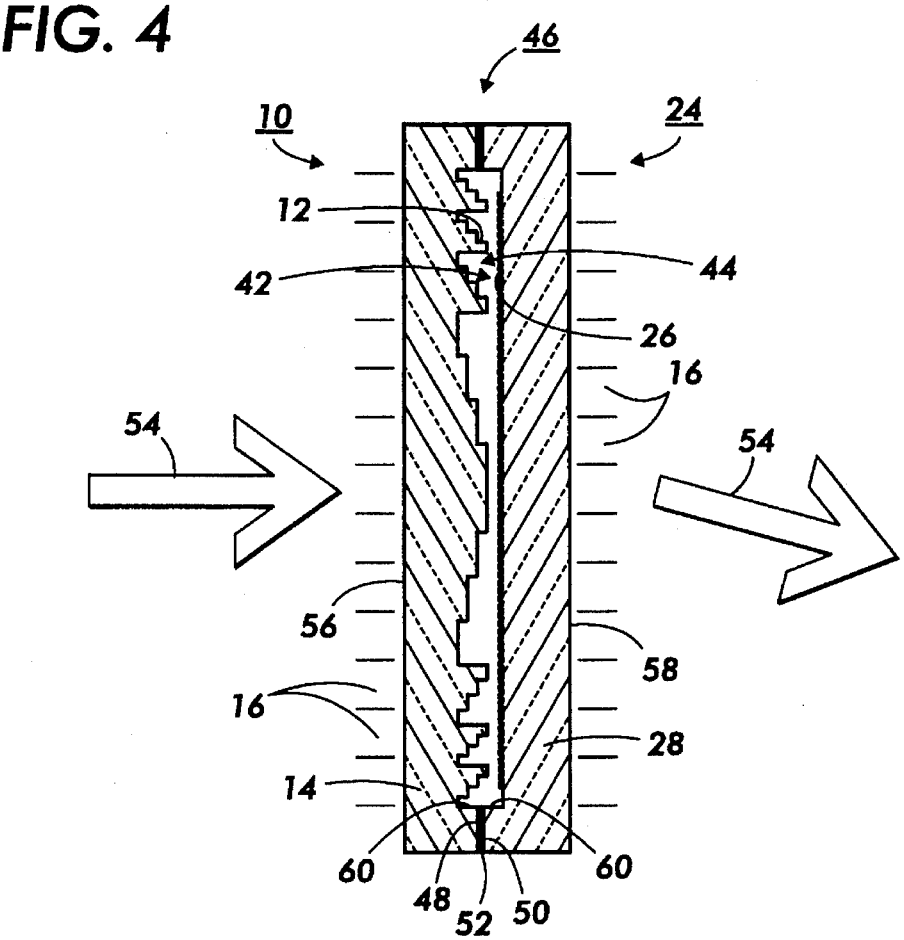
FIG. 4 is a schematic illustration of the cross-section side view of the interior binary diffractive optical element and corrector binary diffractive optical element assembly formed according to the present invention.

The corrector binary diffractive optical element 24, as best seen in FIG. 4, will also be divided into regions 16. The corrector binary diffractive optical element 24 will be fabricated with an induced loss 22 as shown in FIG. 2 for each region 16 to lower the diffraction efficiency of the corresponding region 16 of the binary diffractive optical element 10 to the reference or lowest measured diffraction efficiency 20. Thus, the diffraction efficiencies for all the regions 16 of the binary diffractive optical element 10 will reduced region 16 by region 16 to the common value of the lowest measured diffraction efficiency 20 by introducing compensating diffractive losses 22 region 16 by region 16 from the corrector binary diffractive optical element 24.

The maximum grating pitch for the corrector binary diffractive optical element is the least line spacing yielding a diffractive angle just sufficient to remove the diffracted light beam completely from the optical path. Any smaller pitch will diffract light from the beam at a larger angle.

As shown in FIG. 4, the multi-level surface relief phase grating structure 12 is in a recess 42 in the substrate 14 of the binary diffractive optical element 10. Similarly, the binary surface relief phase grating structure 26 is in a recess 44 in the substrate 28 of the second, corrector binary diffractive optical element 24. When the two binary diffractive optical elements 10 and 24 are closely spaced together in a single optical assembly 46, the recesses 42 and 44. The multi-level surface relief phase grating structure 12 of the binary diffractive optical element 10 is immediately adjacent to the binary surface relief phase grating structure 26 of the second, corrector binary diffractive optical element 24. This close spacing allows the resolution of the corrector to be preserved. An incident light beam will be diffracted by the first binary diffractive optical element 10 yielding a non-uniform diffraction efficiency. The diffracted beam will then be attenuated by the second binary diffractive optical element to produce a uniform diffraction efficiency to the diffracted beam when exiting the assembly.

The recesses 42 and 44 are fabricated by the same mask and etch process and at the same time as the surface relief phase grating structures are fabricated in the substrates. The etching time is merely increased to form the recess in the substrate, then the surface relief phase grating structure is etched.

The recesses should only etched to as great a depth as necessary for bonding the substrates 14 and 28 together. A greater depth of etching than necessary for bonding may induce non-uniformity of the recess and would degrade resolution of the diffracted, attenuated beam.

The interior surface 48 of the binary diffractive optical element 10 and the interior surface 50 of the second, corrector binary diffractive optical element 24 serve as the bonding area for bonding the two elements together. A coating 52 of adhesive, such as an epoxy resin, is applied to the raised surface 48 of the substrate 14 in such a manner that it does not run or spread into the recesses 42 and 44 of the two binary diffractive optical elements. Then, the two substrates are aligned together, with the regions 16 of the multi-level surface relief phase grating structure 12 of the binary diffractive optical element 10 aligned with the corresponding regions 16 of the binary surface relief phase grating structure 26 of the second, corrector binary diffractive optical element 24 to form an assembly 46.

The means 52 of bonding the two substrates together is typically by epoxy resin. The epoxy resin bond is approximately 2 microns thick.

Certain thermal setting epoxy resins may require heat curing. Materials for the binary diffractive optic lens substrate and the lens cover substrate must be selected which would not be effected by the heat curing temperature.

Ultraviolet setting epoxy resin is faster to set while thermal setting epoxy resin is better for setting batches.

The bonding means 52 need not be transmissive to the incident light beam. The binary diffractive optical elements and the recesses and the substrates are light transmissive while the non-transmissive bonding means could serve to absorb incident light. Thus, the only light transmitted through the assembly would be the light diffracted and attenuated by the binary diffractive optical elements. The absorptive bonding means would prevent transmission of extraneous light through the assembly.

Alignment markings can be used to align the two binary diffractive optical elements. At least two alignment markings can be photolithographically produced at predetermined locations on one or both of the substrates. Alignment markings can be made by other conventional means.

Alternatively, the two binary diffractive optical elements might be "optically contacted", a procedure where very flat smooth optical surfaces 48 and 50 are joined in such intimate contact that they hold without cement. A certain minimum size of the optically contacted surfaces is required for this procedure to be effective.

An incident light beam 54 to the assembly 46 passes through the smooth exterior surface 56 of the binary diffractive optical element 10, through the substrate 14 and will be diffracted by the multi-level surface relief phase grating structure 12 with a regional diffraction efficiency 18. The diffracted beam will pass through the recesses 42 and 44 and will be diffracted with an induced loss 22 by the binary surface relief phase grating structure 26 to provide a beam with an uniform diffraction efficiency 20 which passes through the substrate 28 and exits the exteriors surface 58 of the second, corrector binary diffractive optical element 24.

The output beam from the assembly will be the diffracted beam from the binary diffractive optical element which becomes the the nondiffracted beam from the second, corrector binary diffractive optical element.

Thus, the masks for the binary diffractive optical element will be designed and fabricated. The binary diffractive optical element will be exposed and developed by etching. The diffraction efficiencies of regions of the binary diffractive optical element will be measured. The masks for the corrector binary diffractive optical element will be designed and fabricated. The corrector binary diffractive optical element will be exposed and developed by etching. The binary diffractive optical element and the corrector binary diffractive optical element will be aligned and bonded together in an assembly such that a light beam will diffracted by the assembly with a uniform diffraction efficiency. The assembly can then be mass produced in large quantities to provide a uniform diffraction efficiency optical element.

The exterior and interior surfaces 56, 12, 26 and 58 of the binary diffractive optical elements 10 and 24 of the assembly 46 can be coated with an antireflective coating to improve transmission of light beams.

The surface relief phase grating structures of binary diffractive optical elements are susceptible to dirt, oil films from handling and loose particles, all of which can interfere optically with the grating structures. A major concern with binary diffractive optical elements is protection of the patterned surface of the elements. An additional benefit to the interior binary diffractive optical element and corrector binary diffractive optical element assembly is protecting the surface relief phase grating structures of the binary diffractive optical elements without interfering with the optical operation of those elements.

The edges 60 of the recesses 42 and 44 should be to a uniform depth and form a sharp right angle. A curve or rounding to the edges may optically interfere with the light transmitted through the assembly.

The substrates 14 and 28 should be tightly bonded to withstand temperature or pressure changes with air or inert gas or vacuum in the recesses between the binary diffractive optical elements 10 and 24 of the assembly 46.

Alternately, a pinhole breather hole (not shown) can be fabricated between the outside ambient atmosphere and the recesses between the two binary diffractive optical elements to equalize the pressure and temperature between the two regions. The breather hole should be located outside of the surface relief phase grating structures so as to not interfere optically with the incident or output light beam nor with the operation of the binary diffractive optical elements. Otherwise, the breather hole can extend through the substrate 14 of the binary diffractive optical element 10 or the substrate 28 of the corrector binary diffractive optical element 24 or through the bonding means 52. The breather hole can be fabricated by the etching process or any other conventional means.

The breather hole also allows solvents used in the forming of the interior patterned surfaces of the binary diffractive optical elements forming the recesses to evaporate into the outside ambient atmosphere without leaving residue to possibly interfere with the optical operation of the binary diffractive optical elements.

It is preferred that the binary diffractive optical element substrate and the corrector binary diffractive optical element substrate be the same material when large temperature variations are expected since different materials will have different thermal expansion and contraction. Otherwise, different optically transmissive materials could be used for the two substrates.

An alternate method of forming the two binary diffractive optical elements 10 and 24 is by a conventional molding process using a master element or mold. In general, the molding process involves pressing a mold with the negative of the binary diffractive optical element pattern into a substantially flat, soft coating, such as a plastic or polymer or other organic material, on the plano surface of the spherical lens forming the binary diffractive optical element pattern in the coating. The mold is typically nickel. The coating must be able to be mold pressed, be optically transmissive and be able to retain the binary diffractive optic lens pattern so that the element will operate optically. The hard substrate is typically fused silica (artificial quartz). The substrate may also be glass, quartz, germanium, silicon, optical plastic such as PMMA, polysterene or any material that will transmit light in the desired wavelength.

Figure 5:
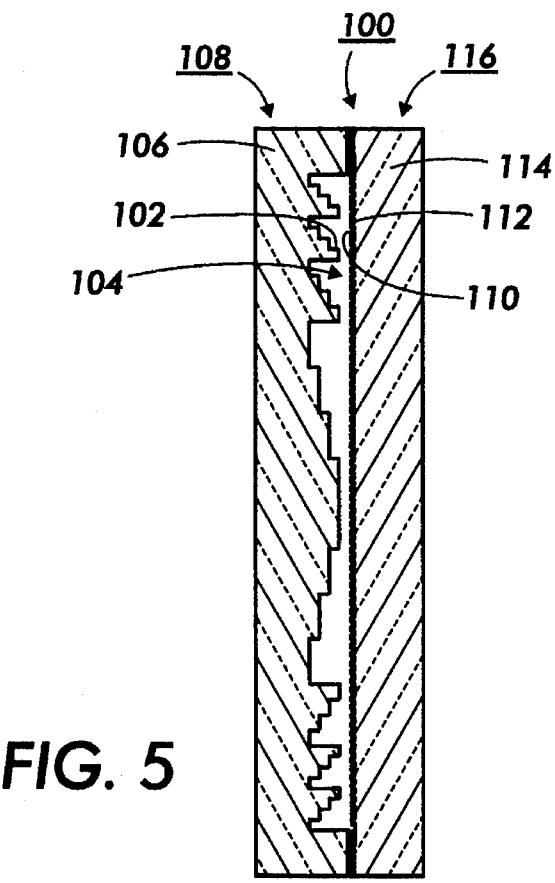
FIG. 5 is a schematic illustration of the cross-section side view of an alternate embodiment of the interior binary diffractive optical element and corrector binary diffractive optical element assembly formed according to the present invention.

The recess need not be formed in both binary diffractive optical elements for the interior assembly. The assembly 100 of FIG. 5 has the multi-level surface relief phase grating structure 102 in a recess 104 in the substrate 106 of the binary diffractive optical element 108. The binary surface relief phase grating structure 110 is on the flat smooth surface 112 of the substrate 114 of the corrector binary diffractive optical element 116. The recess 104 is sufficiently deep that the surface relief phase grating structures 102 and 110 are still closely spaced but do not physically or optically interfere when the substrates 106 and 114 are bonded together. Etching and bonding of the assembly 100 are as previously described. Alternately, the recess could be formed in the corrector binary diffractive optical element with the surface relief phase grating structure of the binary diffractive optical element being fabricated on a flat smooth surface.

Figure 6:
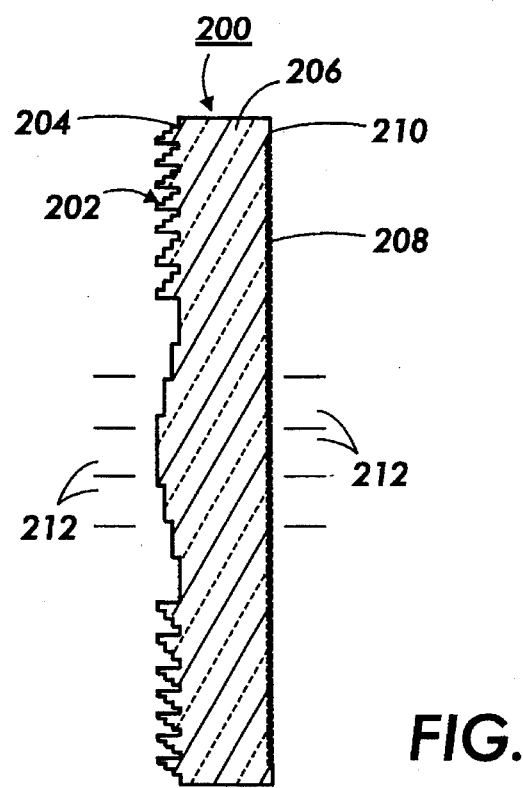
FIG. 6 is a schematic illustration of the cross-section side view of an exterior binary diffractive optical element and corrector binary diffractive optical element assembly formed according to the present invention.

The surface relief phase grating structures can be fabricated on the exterior of the assembly. The optical element 200 of FIG. 6 has a multi-level surface relief phase grating structure 202 of a binary diffractive optical element on one exterior surface 204 of the substrate 206 with the binary surface relief phase grating structure 208 of the second corrector binary diffractive optical element on the other opposing surface 210 of the substrate 206 of the optical element 200. Regions 212 of the multi-level surface relief phase grating structure 202 correspond with regions 212 of the binary surface relief phase grating structure 206. The only requirement is that the substrate be sufficiently thin so that the two grating structures are closely spaced within the optical path of the incident light beam to be diffracted and attenuated. Etching of the surface relief phase grating structures is as previously described. Alternately, the binary diffractive optical element and the corrector binary diffractive optical element can be fabricated separately and binded together by previous described means with the surface relief phase grating structures on the exterior surfaces of the assembly.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical element assembly for providing a uniform diffraction efficiency to a diffracted beam comprising a first binary diffractive optical element having a multiple level surface relief phase grating structure on a first substrate, said grating structure of said first binary diffractive optical element being divided into regions, each of said regions having a diffraction efficiency for said diffracted beam, a second binary diffractive optical element having a binary level surface relief phase grating structure on a second substrate, said grating structure of said second binary diffractive optical element being divided into regions corresponding to said regions of said first binary diffractive optical element, said regions of said second binary diffractive optical element inducing loss to said diffracted beam such that for each region said diffraction efficiency of said first binary diffractive optical element and said loss of said second binary diffractive optical element equal the lowest diffraction efficiency of said regions of said first binary diffractive optical element, and bonding means for securing said first binary diffractive optical element and said second binary diffractive optical element together.

2. The optical element assembly for providing a uniform diffraction efficiency to a diffracted beam of claim 1 further comprising said multiple level relief phase grating structure being in a recess in said first substrate and said binary level surface relief phase grating structure being in a recess in said second substrate, said first recess in said first substrate and said recess in said second substrate being common after bonding.

3. The optical element assembly for providing a uniform diffraction efficiency to a diffracted beam of claim 2 wherein all of said interior surfaces within said recesses and all of said exterior surfaces of said first and second binary diffractive optical elements are coated with an antireflective coating.

4. The optical element assembly for providing a uniform diffraction efficiency to a diffracted beam of claim 1 further comprising said multiple level relief phase grating structure being in a recess in said first substrate, said recess in said first substrate covering said binary level surface relief phase grating structure on said second substrate after bonding.

5. The optical element assembly for providing a uniform diffraction efficiency to a diffracted beam of claim 1 further comprising said binary level relief phase grating structure being in a recess in said second substrate, said recess in said second substrate covering said multiple level surface relief phase grating structure on said first substrate after bonding.

6. An optical element assembly for providing a uniform diffraction efficiency to a diffracted beam comprising a first binary diffractive optical element having a multiple level surface relief phase grating structure on a substrate, said grating structure of said first binary diffractive optical element being divided into regions, each of said regions having a diffraction efficiency for said diffracted beam, a second binary diffractive optical element having a binary level surface relief phase grating structure on the opposing side of said substrate from said first binary diffractive optical element, said grating structure of said second binary diffractive optical element being divided into regions corresponding to said regions of said first binary diffractive optical element, said regions of said second binary diffractive optical element inducing loss to said diffracted beam such that for each region said diffraction efficiency of said first binary diffractive optical element and said loss of said second binary diffractive optical element equal the lowest diffraction efficiency of said regions of said first binary diffractive optical element.

7. The optical element assembly for providing a uniform diffraction efficiency to a diffracted beam of claim 6 wherein said first binary diffractive optical element and said second binary diffractive optical element are coated with an antireflective coating.

* * * * *